United States Patent Office.

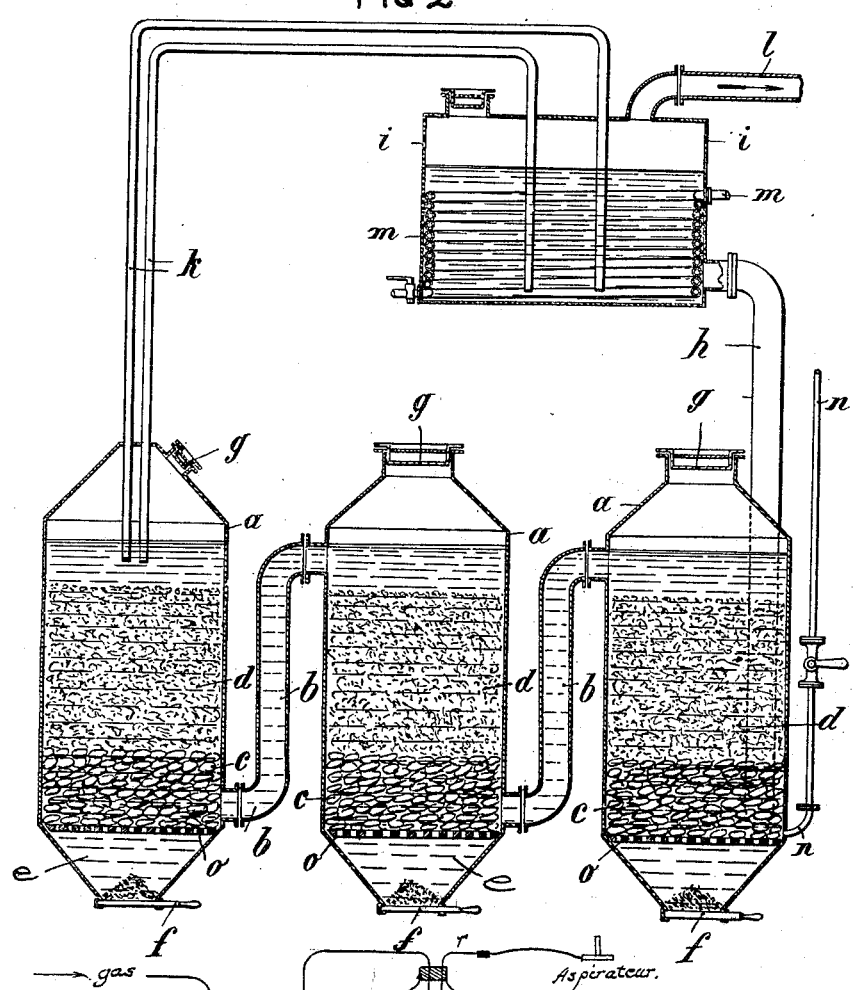

ANTONIN GERMOT, OF ASNIERES, AND HENRI EDMOND LOUIS FIÉVET, OF PARIS, FRANCE.

PROCESS OF TREATING METALLIC SULFIDS.

SPECIFICATION forming part of Letters Patent No. 697,138, dated April 8, 1902.

Application filed March 28, 1901. Serial No. 53,278. (No specimens.)

*To all whom it may concern:*

Be it known that we, ANTONIN GERMOT, engineer of arts and manufactures, of 28 Avenue de Courbevoie, Asnieres, Seine, and HENRI EDMOND LOUIS FIÉVET, civil engineer, of 70 Rue Rodier, Paris, in the Republic of France, have invented a Process of Treating Metallic Sulfids, of which the following is a full, clear, and exact description.

This invention relates to a process of and apparatus for the direct conversion into sulfates of simple or complex sulfid ores, of all metallic sulfids or metallic-sulfid products or subproducts generally.

Our process consists, essentially, in subjecting the sulfid matters above mentioned to the action of ozone or ozonized air.

In carrying out the invention in practice we may simply pass a current of ozone or ozonized air over the matters, either in a dry state or when moistened with the various liquids hereinafter referred to. With a view, however, of hastening the reaction, we prefer to place the materials in suspension in an inert liquid or one capable of facilitating the reaction, and then blow through ozone or ozonized air, so that the liquid with the sulfid in suspension therein being emulsified a rapid reaction ensues, whereby the sulfid becomes speedily converted into sulfate, as hereinafter more fully described.

Figure 1 is a diagram to explain the theory of operation of the process. Fig. 2 is a view of one form of apparatus for carrying out the process.

Referring first to the diagram, Fig. 1, it will be seen that two vessels A and B are shown, which are connected, as in the figure, by a rubber tube C of rather large diameter and by the glass tube L of small diameter. The vessel B is placed upon a higher level in relation to the vessel A. Furthermore, it is attached to an aspirator by means of the tube $r$. The lower part of the vessel A communicates through the pipe G with a gas condenser or reservoir. By filling the vessel B with liquid this will run into A, and the level will stop at $m\ n$. The liquid will be equilibrated at the level $m\ n$ throughout the apparatus. Now we operate the aspirator or suction apparatus, and the liquid in the tube L will be sucked up and will fall into the vessel B until the level in the vessel A is at $o\ o$. At this period the gas enters into the tube L, while simultaneously the liquid of B passes into A when the level has reached $n'\ m'$. This means that the level of the liquid in A tends always to rise above the level of $o\ o'$. Then the liquid ascends into the pipe, but at the same time the elastic force of the gas forces the liquid to sink below the level $o\ o'$. At that moment the gas passes and forces ahead the liquid which was originally contained in the pipe. The quantity of liquid carried ahead is relatively slight in each instance, but as this action is repeated many times in each second with such rapidity that it appears continuous to the eye it will appear readily that there is simultaneous circulation of liquid and gas in the apparatus. The same phenomena take place if instead of a single vessel A several are connected in series, as shown in Fig. 2.

The apparatus employed may obviously be varied without affecting the invention, but in order to most effectually present to the action of the gaseous globules the particles of solid matters in suspension we have designed an apparatus of which the accompanying drawings represent a longitudinal section.

The sulfid ore or product to be treated, having first been brought to a granular or pulverulent condition, is placed in any suitable number of vessels $a$, connected in series by pipes $b$ and each provided at bottom with a grid $o$, covered with a layer of flint or inert matter $c$, upon which is placed the sulfid product $d$ to be treated. A space $e$ beneath the grid $o$ receives the slimes which may be discharged at openings closed by valves $f$.

The matter to be treated is charged in through manholes $g$, and the first vessel of the series is connected by means of a pipe $h$, with a tank $i$, containing the liquid used as the vehicle for the sulfid product. From the upper part of the last vessel $a$ of the series (the third one in the example) lead tubes $k$ of small diameter pass down to the bottom of the feed-tank $i$. From the top of the tank $i$ an air-discharge pipe $l$ leads either to the atmosphere or to an exhauster, and the tank is provided with a coil $m$ or other means of heating the liquid $i$ to the desired temperature by steam or other heating agent. The vessels *a* having been filled with the liquid, ozone or ozonized air is admitted through a pipe *n*, just above the grid *o* of the first vessel of the series, the gas either being supplied under pressure by a pump or from a generator or gas-holder or being drawn through the apparatus by suction produced at the tail end of the series by a pump, ejector, or other suitable exhauster. The gas, finely divided in passing through the inert mass *c*, agitates the liquid, forming a kind of emulsion, and after passing through the several vessels *a* in succession escapes through the pipes *k*. Owing to the relatively small diameter of these tubes the liquid which enters along with the gas carries the latter with it into reservoir *i*, where a supplementary action takes place. The pressure in the apparatus being kept constant, the level of the liquid in the supply-tank *i* also remaining constant, the volume of liquid entering the tank by tubes *k* being replaced in the vessels *a* by an equal volume of liquid entering by a pipe *h*. A continuous circulation of the liquid holding in suspension the matter to be treated is thus maintained, and the ozonized gas is brought into the most intimate contact with the solid particles. The liquid employed may be plain water; but we may add matters capable of entering into the reaction or of facilitating by catalysis the reaction of the ozone upon the sulfids or serving as vehicle for the ozone by solution or otherwise and facilitating its action upon the sulfid compound under treatment. For example, we may mix acids with the liquid, particularly sulfurous, sulfuric, hydrochloric, or nitric acids, which, as the case may be, may facilitate the reaction by their presence or enter into the reaction. For example, in treating simple or complex sulfid ores of lead, zinc, tin, and antimony the acid only facilitates the reaction, whereas in the treatment of copper matte, ($Cu_2S$,) the proportion of sulfur in the substance treated being insufficient for the conversion of the whole of the metal into sulfate, sulfuric acid added to the liquid enters into the reaction by supplying the deficiency of sulfur.

It is to be understood that the term "acid" includes not only the acids but all other chemical compounds capable of acidifying the bath or of furnishing by decomposition the necessary proportion of acid. Similarly we may add to the liquid serving as a vehicle for the sulfid any other liquid capable of dissolving ozone and of thus facilitating its action upon the material under treatment. Among the solvents of ozone may be more especially mentioned spirit of turpentine. It will thus be seen that the process permits of the direct sulfatation of all metallic-sulfid compounds and particularly sulfid ores and metallurgical mattes.

The temperature of the reaction depends on the nature of the substances under treatment; but it should be high enough to enable the reaction of the ozone to take place and low enough to avoid the ozone undergoing change—say between the limits of 60° and 300° Fahrenheit.

We claim—

The process for the conversion of sulfids into sulfates consisting in subjecting them to the action of ozonized air by holding them in suspension in a liquid in the presence of an acid and blowing a current of ozone into the liquid essentially as explained.

The foregoing specification of our process of and apparatus for treating metallic sulfids signed by us this 12th day of March, 1901.

ANTONIN GERMOT.
HENRI EDMOND LOUIS FIÉVET.

Witnesses:
EDWARD P. MACLEAN,
MAURICE H. PIGUET.